US006285867B1

United States Patent
Boling et al.

(10) Patent No.: US 6,285,867 B1
(45) Date of Patent: Sep. 4, 2001

(54) COMBINATION EMERGENCY PHONE AND PERSONAL AUDIO DEVICE

(75) Inventors: Brian M. Boling; Michael C. Bernstein; Nicolas A. Natale, all of Knoxville, TN (US)

(73) Assignee: American Secure Care, LLC, Knoxville, TN (US)

( * ) Notice: Subject to any disclaimer, the term of this patent is extended or adjusted under 35 U.S.C. 154(b) by 0 days.

(21) Appl. No.: 09/185,191

(22) Filed: Nov. 3, 1998

Related U.S. Application Data (63) Continuation-in-part of application No. 09/173,645, filed on Oct. 16, 1998.

(51) Int. Cl.[7] .................................................... H04B 7/00
(52) U.S. Cl. ........................................... 455/404; 455/564
(58) Field of Search ................................. 455/404, 550, 455/564, 566, 414

(56) References Cited

U.S. PATENT DOCUMENTS

| | | | |
|---|---|---|---|
| 4,446,454 | 5/1984 | Pyle | 340/538 |
| 4,591,661 | 5/1986 | Benedetto et al. | 179/2 |
| 4,993,061 | 2/1991 | Hsieh | 379/61 |
| 5,148,473 | 9/1992 | Freeland et al. | 379/59 |
| 5,203,009 | 4/1993 | Bogusz et al. | 455/33.1 |
| 5,305,370 | 4/1994 | Kearns et al. | 379/45 |
| 5,334,974 | 8/1994 | Simms et al. | 340/990 |
| 5,365,570 | 11/1994 | Boubelik | 379/59 |
| 5,377,256 | 12/1994 | Franklin et al. | 379/59 |
| 5,465,388 | 11/1995 | Zicker | 455/33.1 |
| 5,479,482 | 12/1995 | Grimes | 379/59 |
| 5,594,425 | 1/1997 | Ladner et al. | 340/825.06 |
| 5,687,215 | 11/1997 | Timm et al. | 379/59 |
| 5,694,452 | 12/1997 | Bertolet | 379/51 |
| 5,742,686 | 4/1998 | Finley | 380/28 |
| 5,742,904 * | 4/1998 | Pinder | 455/404 |
| 5,745,849 * | 4/1998 | Britton | 404/404 |
| 5,748,089 | 5/1998 | Sizemore | 340/574 |
| 5,815,118 | 9/1998 | Schipper | 342/451 |
| 5,991,637 * | 11/1999 | Mack | 455/550 |
| 6,014,555 * | 1/2000 | Tendler | 455/404 |

* cited by examiner

Primary Examiner—William Cumming
Assistant Examiner—Nick Corsaro
(74) Attorney, Agent, or Firm—Luedeka, Neely & Graham, P.C.

(57) ABSTRACT

A combination personal audio device and emergency phone provides a user with personal audio entertainment while also providing full duplex wireless communication with an emergency response service. The apparatus includes an audio information access device, such as a compact disc player, for accessing audio information and generating an electrical audio information signal based upon the audio information. A transmitter generates an outgoing communication signal that is capable of reaching and being received by the emergency response service. A single emergency response switch is the user's sole means for activating the transmitter. When pressed, the emergency response switch activates the transmitter to generate the outgoing communication signal. A receiver receives an incoming communication signal from the emergency response service, and generates an audio communication signal based upon the incoming communication signal. An audio amplifier receives and amplifies the electrical audio information signal and the audio communication signal to produce an amplified electrical audio information and an amplified audio communication signal. A sound production device converts the amplified electrical audio information signal and the amplified audio communication signal into acoustical sound waves capable of being aurally perceived by the user. The apparatus includes an aural alarm, such as a siren, and a visual alarm, such as a flashing light, to alert individuals in an area surrounding the apparatus when an emergency situation exists.

21 Claims, 8 Drawing Sheets

COMBINATION EMERGENCY PHONE AND PERSONAL AUDIO DEVICE

This is a continuation-in-part of co-pending patent application Ser. No. 09/173,645 filed Oct. 16, 1998, and entitled EMERGENCY PHONE FOR AUTOMATICALLY SUMMONING MULTIPLE EMERGENCY RESPONSE SERVICES.

FIELD OF THE INVENTION

In general, the present invention relates to personal wireless communication devices. More particularly, the present invention relates to an apparatus that combines a single-button emergency cellular telephone with a personal audio device.

BACKGROUND OF THE INVENTION

Personal audio devices, such as portable compact disc players, cassette tape players, and AM/FM stereo radios, have become increasingly popular with persons wishing to have audio entertainment on the go. Typically, these devices are small and lightweight, and are carried by the user in one hand, or are attached to the user's clothing, or strapped to the user's body. Such devices are frequently used by joggers, bikers, bicyclists, and others who want to combine personal audio entertainment with personal mobility.

Joggers, hikers, and bicyclists usually wish to minimize the weight they must carry so as to minimize the amount of energy expended. Therefore, one common characteristic of these users of personal audio devices is that they tend to travel as lightly as possible. Another common characteristic of these users of personal audio devices is that they tend to travel into areas where hazardous situations are plentiful. For example, hikers may travel into remote wilderness areas where natural hazards abound. Joggers may travel into city parks and through dark streets or alleys where they are susceptible to attack from muggers. All of these travelers need a way to summon help when they are injured or attacked.

Emergency response services, such as the familiar 911 service, provide individuals with a quick and easy way to contact emergency response personnel when an emergency situation arises. By providing a standardized method of contacting emergency personnel, these emergency response services are effective in reducing the amount of time necessary to respond to an emergency. In an emergency, the amount of time required to respond can often mean the difference between life and death.

With the advent of cellular telephone technology, it is now possible for a jogger, hiker, or bicyclist to carry a cellular telephone that allows them to contact an emergency response service from practically anywhere. However, the typical cellular telephone adds further weight, fills another pocket, and further impedes mobility. Another drawback associated with the typical cellular phone is the high cost of cellular service. Most cellular services charge a periodic fee, regardless of whether the user actually makes a cellular call during the service period.

Cellular devices and services have been offered that are limited to emergency use only. These devices have several buttons that allow a variety of emergency services such as fire, medical and police to be summoned. By restricting use of the cellular phone to emergency situations, the user can either avoid or defer some of the costs associated with a full service cellular phone. However, these prior art emergency devices have multiple buttons and functions which may cause confusion in an emergency situation. Because of the stress often associated with emergency situations, an operator of such a complex emergency communication device may fail to properly summon emergency personnel. Furthermore, these devices do not have the capability to summon individuals in the immediate area around the device that may be able to provide assistance.

Thus, both personal audio devices and cellular phones provide desirable benefits to persons on the go. The personal audio device provides entertainment, while the cellular phone provides peace of mind. However, when lightweight travel is a goal, it is undesirable to carry two separate electronic devices to provide these benefits.

SUMMARY OF THE INVENTION

The present invention eliminates the oversights, difficulties, and disadvantages of the prior art by providing a user with personal audio entertainment, while also providing full duplex wireless communication with an emergency response service. The apparatus includes a rigid housing constructed from lightweight materials. Disposed within the housing is an audio information access device, such as a compact disc player, for accessing audio information from an audio information source, and for generating an electrical audio information signal based upon the audio information. The apparatus also includes a transmitter disposed within the housing for generating an outgoing communication signal that is capable of reaching and being received by the emergency response service. This outgoing communication signal contains communication information necessary to establish communications with the emergency response service. A receiver disposed within the housing receives an incoming communication signal from the emergency response service, and generates an audio communication signal based upon the incoming communication signal. An audio amplifier receives and amplifies the electrical audio information signal and the audio communication signal to produce an amplified electrical audio information signal and an amplified audio communication signal. The apparatus also has a sound production device electrically connected to the audio amplifier. The sound production device converts the amplified electrical audio information signal and the amplified audio communication signal into acoustical sound waves capable of being aurally perceived by the user.

A preferred embodiment of the invention provides a single emergency response switch on the apparatus, which is the user's sole means for activating the transmitter. When pressed, the emergency response switch activates the transmitter to generate the outgoing communication signal to establish communications with the emergency response service.

The apparatus includes an aural alarm such as a siren, and a visual alarm, such as a flashing light, to alert individuals in an area surrounding the apparatus that an emergency situation exists.

Thus, the present invention eliminates the oversights, difficulties, and disadvantages of the prior art by combining the functions of a personal audio device and the functions of an emergency cellular phone in a single package. The housing, battery, and several electronic components are used by both the personal audio device and the cellular phone, thus significantly reducing weight and volume as compared to having two separate devices.

Further, activation of the emergency cellular phone by use of a single emergency response switch makes contacting an emergency response service exceedingly simple. Thus, even in an extremely stressful situation, the emergency cellular phone is almost impossible to operate incorrectly. Furthermore, the simplicity of the device makes it especially adaptable for use by young children and physically or mentally impaired individuals.

BRIEF DESCRIPTION OF THE DRAWINGS

Other objects, features and advantages of the present invention will become apparent by reference to the following detailed description when considered in conjunction with the accompanying drawings, in which like reference characters refer to like parts throughout the views, and wherein.

DETAILED DESCRIPTION OF THE PREFERRED EMBODIMENTS

Figure 1:
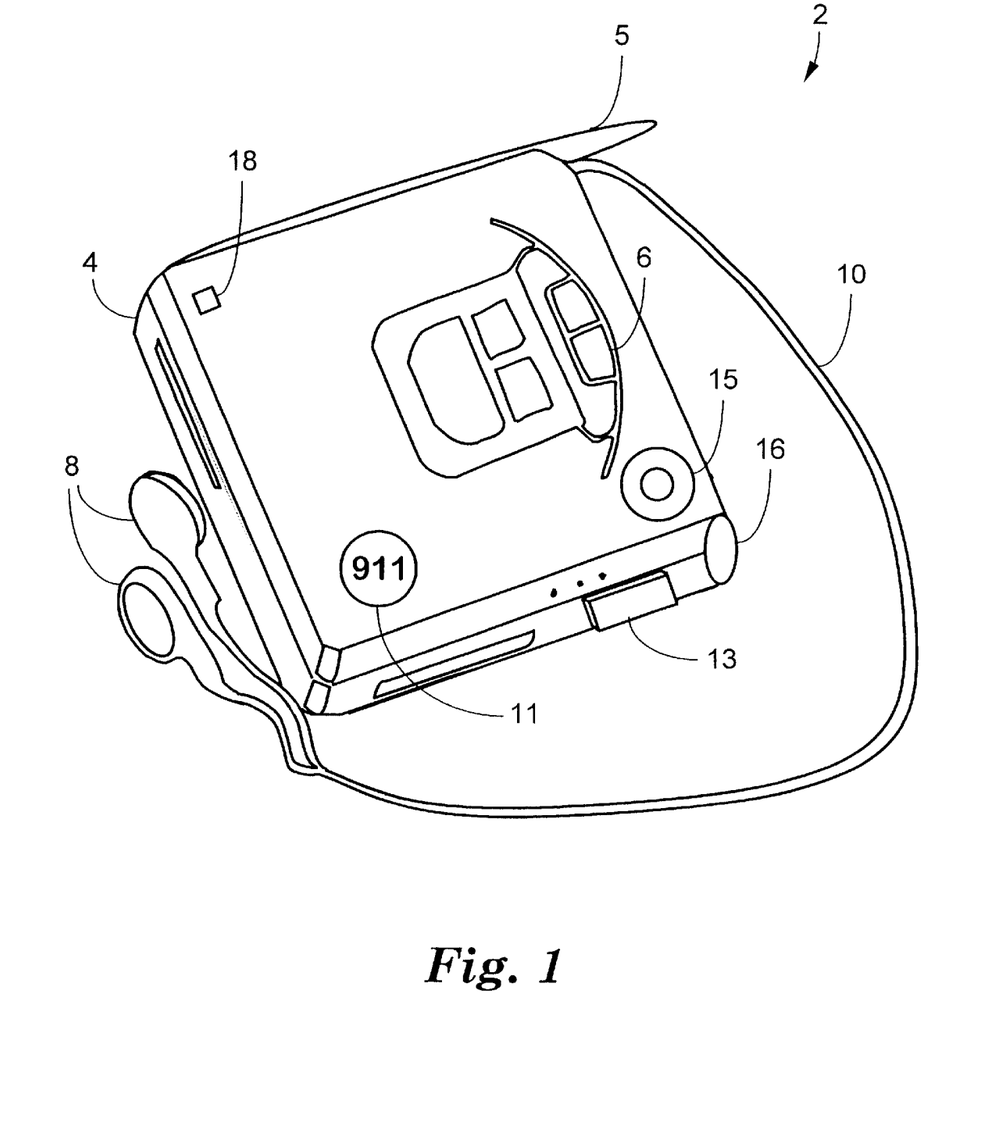
FIG. 1 is an isometric view of a combination personal audio compact disc player and emergency phone in accordance with the present invention.

Shown in FIG. 1 is an isometric view of a preferred embodiment of an apparatus, hereinafter referred to as a player/phone 2, that combines the entertainment of a personal audio device and the help-summoning capability of a "911" emergency phone. In the embodiment of FIG. 1, the personal audio device is a compact disc (CD) player for playing digitally-encoded CD's. With the exception of a set of earphones 8, the electronic components of the player/phone 2 are all contained within a common housing 4. In the preferred embodiment of the player/phone 2, the housing 4 is a lightweight and rugged shell molded from high-impact thermoplastic. A user keypad 6, mounted on a surface of the housing 4, provides the user with CD player control functions, such as "play", "fast-forward", "fast-reverse", "eject", and other such functions.

Disposed on the housing 4 is a single large emergency response button 11, preferably red in color, and bearing a label such as "911". By pressing the emergency response button 11, the user closes an emergency response switch that is disposed within the housing 4. As discussed in greater detail hereinafter, the closing of this single switch activates the emergency cellular phone, and causes the phone to dial "911", or to dial any other phone number that is appropriate to contact an emergency response service. Thus, should the user encounter an emergency situation, the user can simply press the emergency response button 11 to summon help. Even if the user is incapacitated to the point where the user cannot see the button 11, the large size and shape of the button 11 make the button 11 easy to find and press.

In the preferred embodiment, once a communication channel is assigned to the player/phone 2 after the user has pressed the emergency response button 11, the player/phone 2 automatically contacts a private emergency response service. Preferably, this private service, to which the caller has previously subscribed, maintains a list of persons to contact when the caller presses the emergency response button 11. When cellular communications have been established between the private service and the player/phone 2, the player/phone 2 transmits information to the private service indicating the identity and location of the caller. The private service then forwards this information to the persons on the contact list, and informs the persons on the list that the caller is involved in an emergency situation in a particular location.

In a preferred embodiment of the invention, the player/phone 2 contacts the private emergency response service by sending a paging message to a central paging service. The paging message contains (1) an identification number that has been assigned to the player/phone 2 from which the emergency call was made, (2) the time that the emergency call was made, (3) the telephone area code from which the emergency call was made, and, in one embodiment of the invention, (4) longitude/latitude coordinates of the location of the player/phone 2. Preferably, the player/phone 2 repeatedly transmits this paging message every five minutes from the time that the emergency response button 11 is pressed. The paging service forwards the paging message to the private emergency response service.

After the player/phone 2 has transmitted the identity/location information to the private emergency response service, the player/phone 2 automatically calls a public emergency response service, such as the familiar 911 service.

Once the player/phone 2 has established communication with the public emergency response service, the user may speak with the public emergency response personnel by speaking into the microphone 18 that is mounted in the housing 4. The user can hear the emergency personnel by way of the earphones 8. Outgoing and incoming cellular telephone signals are transmitted and received by way of an antenna 5 attached to the housing 4.

Also disposed on the housing 4 is an alarm button 13, bearing a label such as "Alarm". By pressing the alarm button 13, the user closes an alarm switch 14 (FIGS. 4–6) that is disposed within the housing 4. As discussed in greater detail below, closing the alarm switch 14 activates a high-volume audible alarm such as a siren-like sound, that emanates from a speaker 15 disposed within the housing 4. Under attack, or threat of attack, the user can press the alarm button 13 to scare away the attacker and summon help from persons who may be within hearing range of the alarm.

With continued reference to FIG. 1, the player/phone 2 includes a high-intensity flashing light 16, such as a strobe light, disposed in the housing 4. As discussed in more detail below, the flashing light 16 serves as a visual alarm that is also activated when the user presses the alarm button 13. Thus, when the alarm button 13 is pressed, the player/phone 2 produces a visual as well as an audible alarm to summon help from persons nearby.

Figure 2:
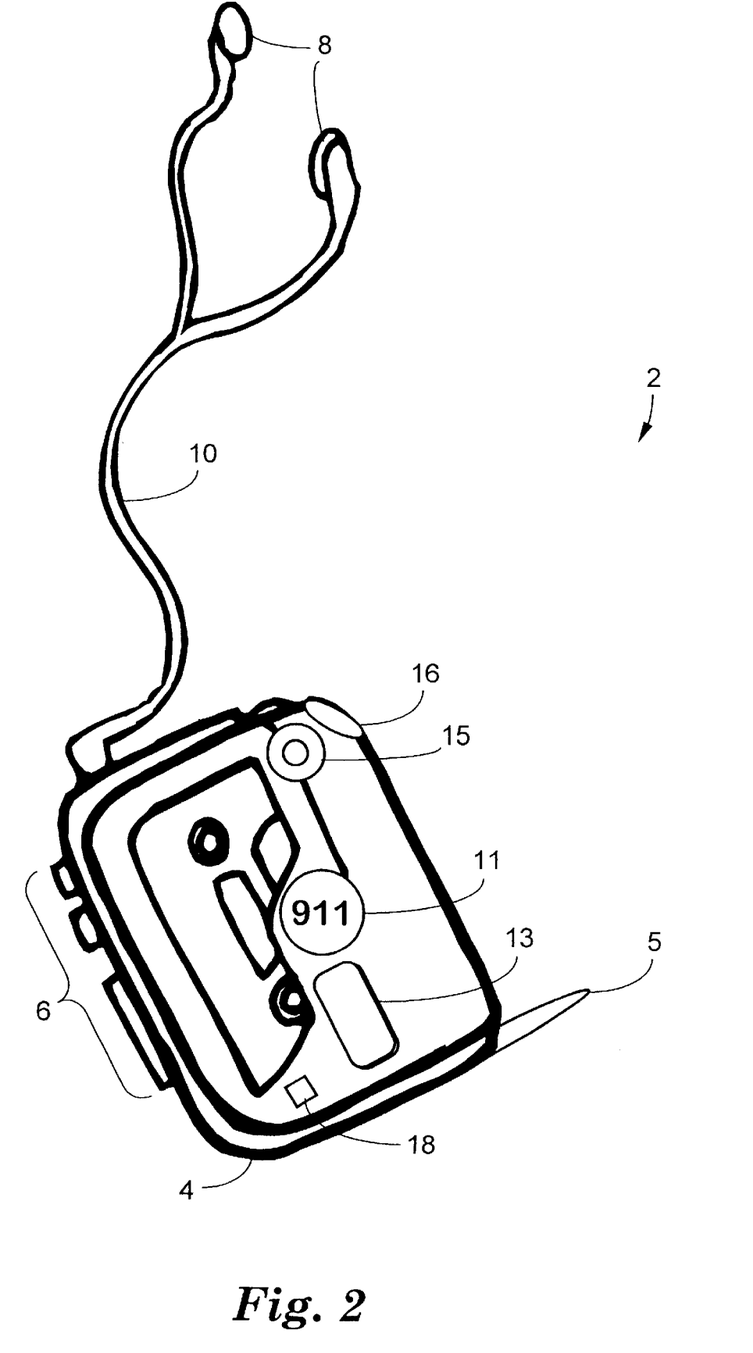
FIG. 2 is an isometric view of a combination personal audio cassette tape player and emergency phone in accordance with the present invention.

Shown in FIG. 2 is an isometric view of an alternate embodiment of the player/phone 2. In this embodiment, the personal audio device is an audio cassette tape player for playing magnetic tape cassettes. Except for slight variation in location of some components, the above description given with reference to FIG. 1 applies as well to the emergency phone and alarm features of the embodiment shown in FIG. 2. In another embodiment of the invention, the personal audio device is an AM/FM radio receiver.

Figure 3:
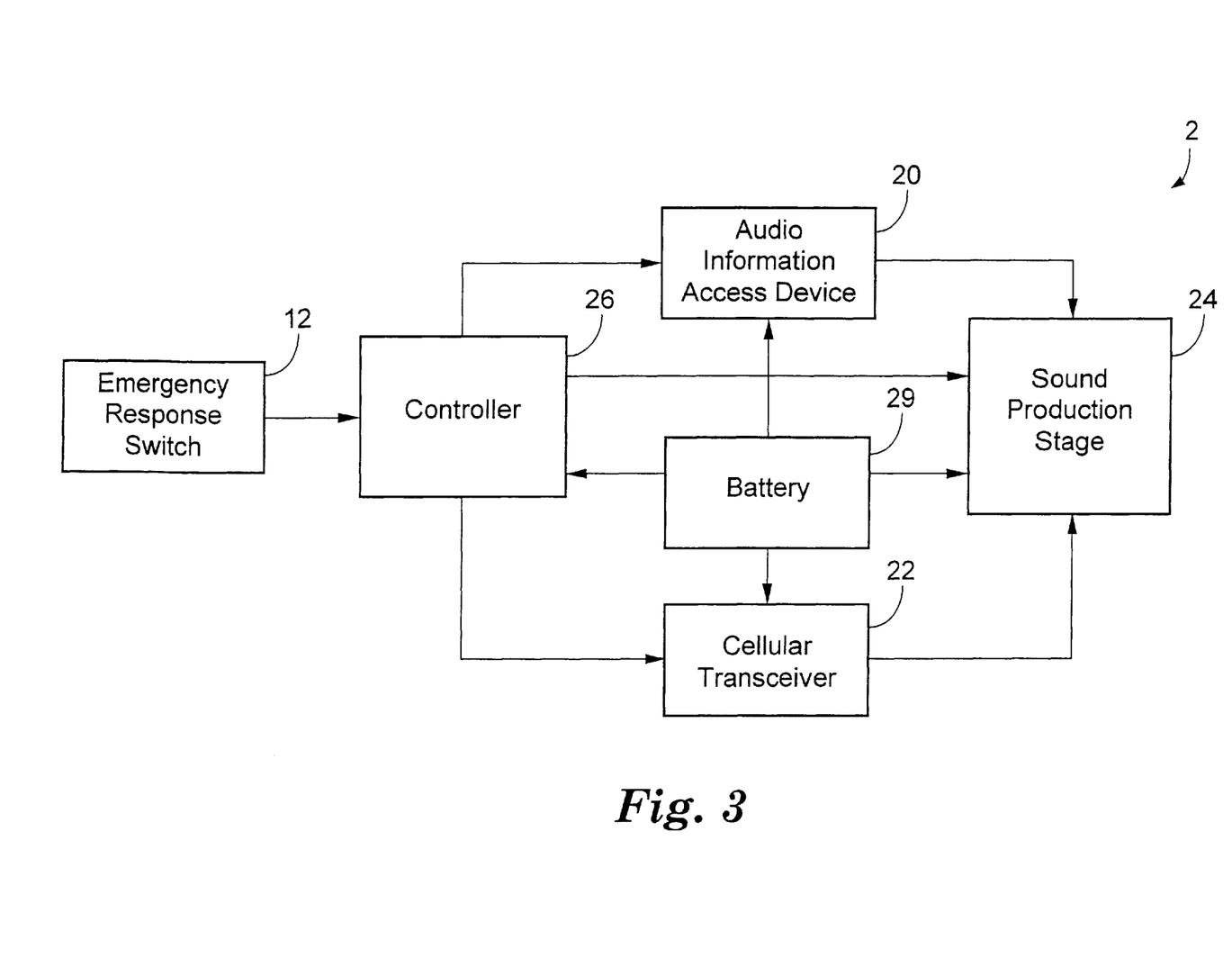
FIG. 3 is a functional block diagram of a combination personal audio device and emergency phone.

FIG. 3 shows a general functional block diagram of the player/phone 2. The player/phone 2 includes four main components: an audio information access device 20, a cellular transceiver 22, a sound reproduction stage 24, and a controller 26.

As discussed above, the audio information access device 20 is a device for accessing audio information, such as music or speech. The audio information is stored on an audio information storage medium, such as a digital audio disc or audio cassette tape, or is carried by radio broadcast signals. In either case, the audio information access device 20 generates an electrical audio information signal corresponding to the audio information.

The electrical audio information signal passes to the sound production stage 24. As discussed in greater detail hereinafter, the sound production stage 24 includes an audio amplifier for producing an amplified electrical audio information signal. The amplified audio signal drives a device, such as earphones or headphones, that generates an acoustical audio signal based upon the amplified electrical audio signal. The acoustical audio signal is in the form of airborne acoustical waves that the user perceives as sound.

The cellular transceiver 22 includes means for transmitting and receiving communication signals, preferably radio frequency cellular telephone signals. A transmitter within the cellular transceiver 22 generates outgoing communication signals that are capable of being received by the emergency response services. These outgoing communication signals contain communication, information, such as the 911 phone number, necessary to establish communication with the emergency response services. Once communications have been established, a cellular receiver within the cellular transceiver 22 receives incoming communication signals transmitted by the emergency response service. The receiver generates audio communication signals based upon the received incoming communication signals, and passes the audio communication signals to the sound production stage 24. The audio amplifier within the sound production stage 24 generates amplified audio communication signals to drive the earphones or headphones 8.

With continued reference to FIG. 3, the player/phone 2 includes a controller 26, such as a digital microprocessor. As explained in greater detail below, the controller 26 provides control signals to the audio information access device 20, the cellular transceiver 22, and the sound production stage 24. The controller 26 also monitors the state of an emergency response switch 12. (FIGS. 3–6). When the user presses the emergency response button 11 which changes the state of the emergency response switch 12, the controller 26 generates the appropriate control signals to activate the cellular transceiver 22 for generating the outgoing communication signals, to deactivate the audio information access device 20, and to direct the sound production stage 24 to produce acoustical signals for the user based upon the audio communication signals from the cellular transceiver 22.

Each of the components of the player/phone 2 are powered by a common power source, such as a rechargeable battery 29 or battery pack. The common battery 29 represents one of the advantages of the player/phone 2 over prior art devices. The power source for any cellular phone tends to be one of the phone's most bulky and heavy components. The use of a common battery 29 for both the cellular transceiver 22 and the audio information access device 20 significantly reduces the weight and volume of the combined unit.

Another advantage of the present invention, one that is made more obvious in the discussion that follows, is the use of a single sound production stage 24 to amplify the electrical audio signals from both the cellular transceiver 22 and the audio information access device 20, and to convert those electrical signals into sound. The use of common audio circuitry for these functions further reduces weight and volume compared to that required for two separate devices.

Figure 4:
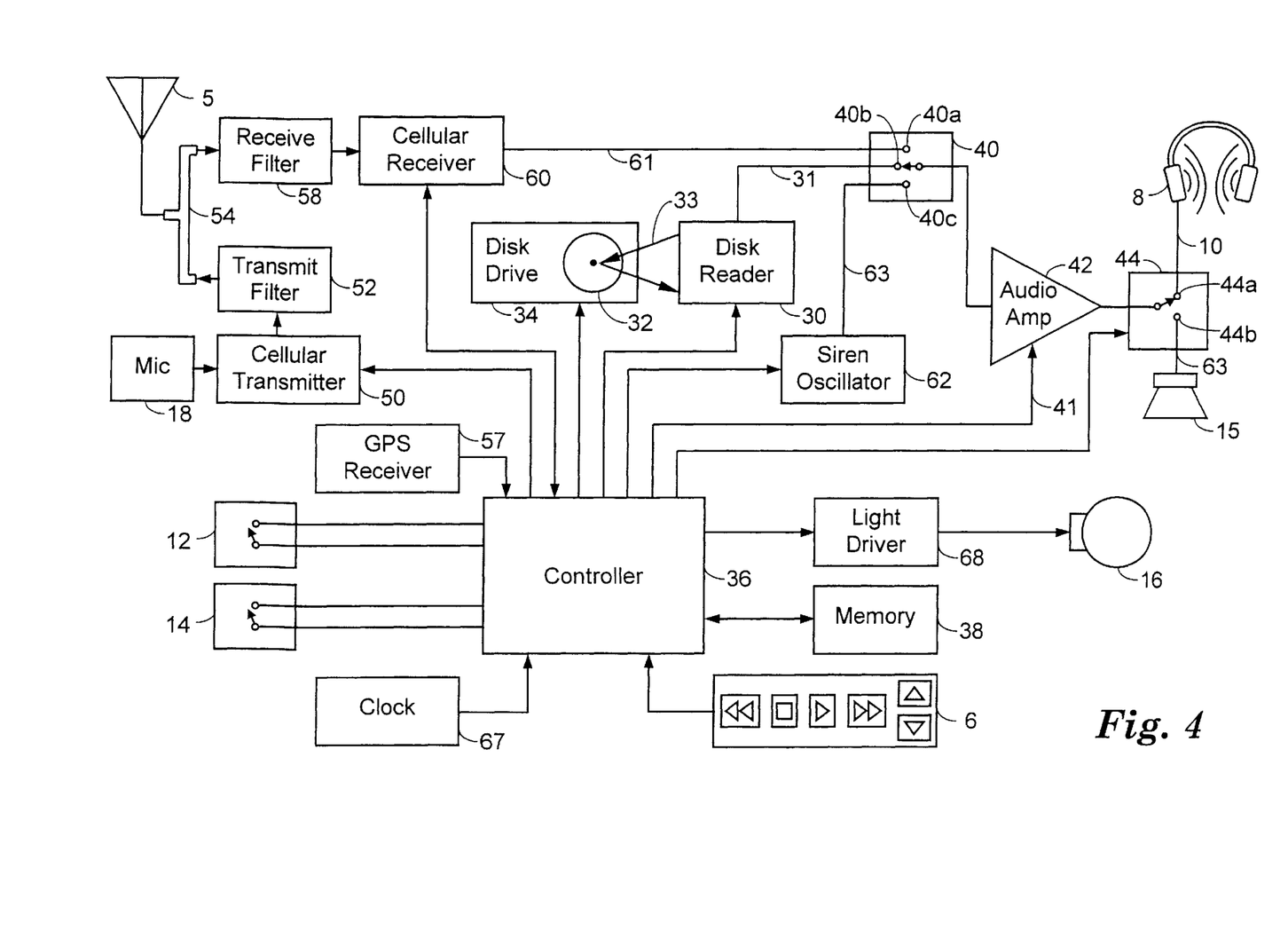
FIG. 4 is a functional block diagram of a combination compact disc player and emergency phone in a personal audio mode.

Shown in FIG. 4 is a more detailed functional block diagram of a preferred embodiment of the player/phone 2. FIG. 4 shows the player/phone 2 while in the personal audio mode, which is the operational state of the player/phone 2 while it is being used to listen to audio information, such as music. This embodiment includes a disc drive 34 for spinning a digital audio disc 32. The digital audio disc 32 of the preferred embodiment is a compact disc wherein the audio information is encoded in a reflective pattern laid out in concentric circles or a spiral on the surface of the disc 32. When the user presses the play button on the user keypad 6, the controller 36 activates the disc drive 34 and the disc reader 30. As the digital audio disc 32 spins, the disc reader 30 generates a laser beam 33 directed at the surface of the disc 32. The laser beam 33 is reflected from the spinning disc 32, with the reflected beam 33 modulated by the reflective pattern in the surface of the disc 32. The reflected laser beam 33 is detected by the disc reader 30, which converts the modulated laser beam into a digitally encoded electrical signal carrying the audio information encoded on the disc's surface. The disc reader 30 then decodes the digitally encoded signal, and generates an analog electrical audio information signal on the line 31 based upon the audio information on the disc 32.

With continued reference to FIG. 4, an audio input switch 40 is at the input to an audio amplifier 42. When the device is in the personal audio mode, with the disc drive 34 and the disc reader 30 active, the controller 36 sets the audio input switch 40 to the position 40b as shown in FIG. 4. In this position 40b, the electrical audio information signal on the line 31 passes to the audio amplifier 42. In the preferred embodiment, the gain of the amplifier 42 is controlled by the controller 36 as determined by a voltage on the line 41. When in the personal audio mode, the controller 36 adjusts the voltage on the line 41 in response to the user's selection of volume level. Preferably, the user adjusts the audio volume using volume buttons on the keypad 6 (FIG. 1).

The amplified audio information signal is present at the input of an audio output switch 44. Depending on the operational mode of the player/phone 2, the audio output switch 44 directs the amplified audio signal to either a set of earphones 8 connected to the switch 44 by way of a flexible audio cable 10, or to a speaker 15 that is disposed inside the housing 4. Preferably, when the player/phone 2 is in the personal audio mode as shown in FIG. 4, the audio output switch 44 is in the position 44a, and directing the amplified audio signal to the earphones 8.

In an alternative embodiment of the invention, the earphones 8 are wireless. In this embodiment, the audio signal is converted into a wireless signal, such as an infrared (IR) or radio frequency (RF) signal, which is transmitted to the headphones 8. The headphones 8 of this embodiment include a receiver, such as an IR or RF receiver, that receives the wireless signal and converts it back into an audio signal.

Figure 5:
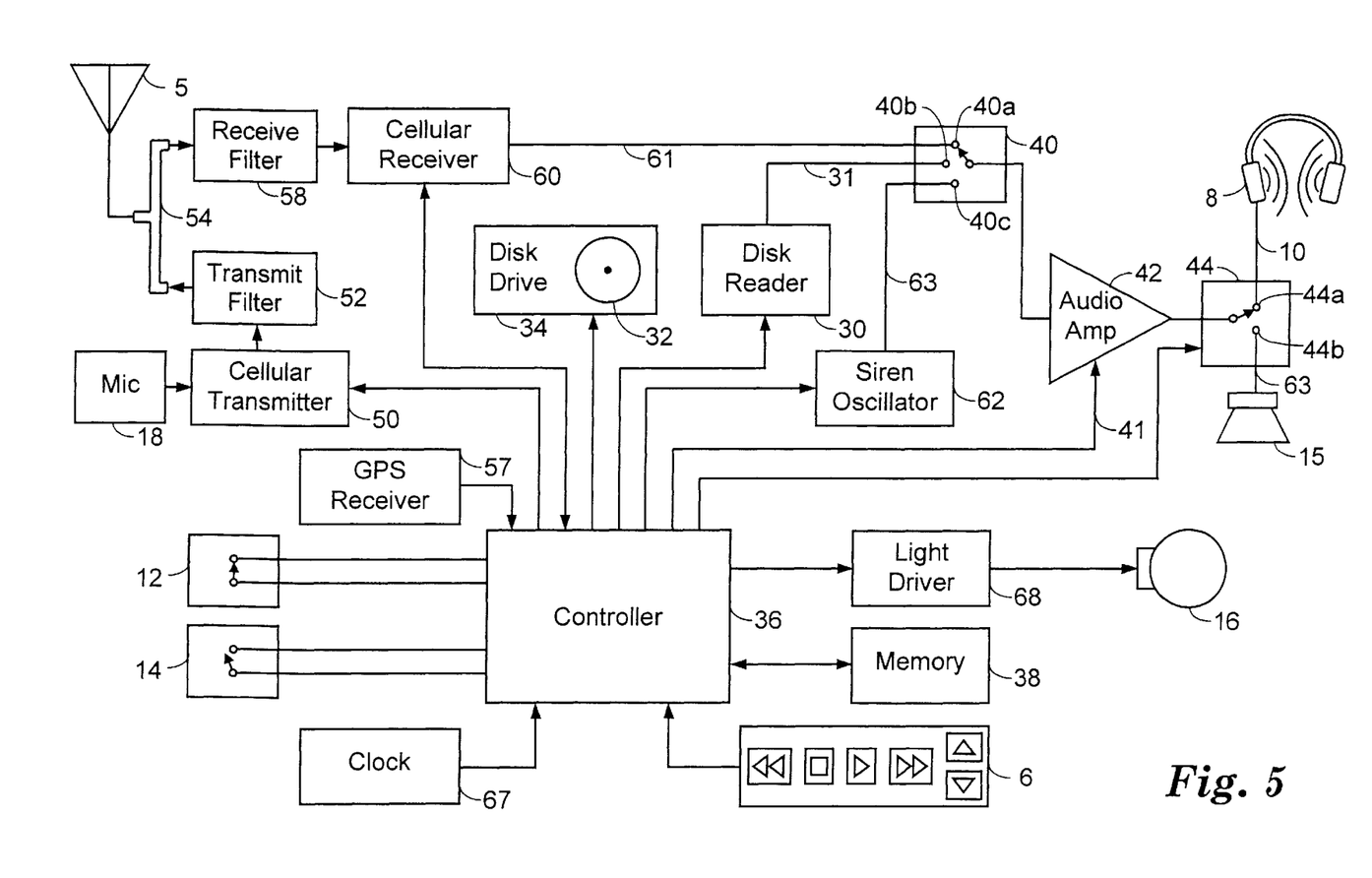
FIG. 5 is a functional block diagram of the combination compact disc player and emergency phone in an emergency mode.

In response to an emergency situation, the user may press the emergency response button 11 on the housing 4 to close the emergency response switch 12 and put the player/phone 2 into an emergency response mode. The controller 36 continuously monitors the state of the emergency response switch 12, and when the controller 36 detects that the switch 12 is closed, the controller 36 executes several different emergency operations to aid the user in the emergency situation. The state of the player/phone 2 while it is in the emergency response mode is illustrated in FIG. 5.

In the preferred embodiment, when the emergency response switch 12 is closed, the controller 36 activates a cellular transmitter 50. When activated, the cellular transmitter 50 generates an RF cellular telephone signal encoded with the phone number of the paging service. Preferably, the phone number, which is user-programmable, is stored in a memory device 38. A transmit filter 52 connects the cellular transmitter 50 to one end of a microstrip line 54. The microstrip line 54 connects at the other end to the antenna 5. The antenna 5 broadcasts the outgoing RF cellular signal that is received by the paging service.

When cellular communications have been established with the paging service, the controller 36 retrieves the player/phone's identification number from the memory 38. The controller 36 also retrieves the current time from a real-time clock 67. In the embodiment of the invention that includes a global positioning system (GPS) receiver 57, as described in more detail hereinafter, the controller 36 retrieves the location information from the GPS receiver 57. The controller 36 then sends the player/phone's identification number, the current time, the location information, and, preferably, the telephone area code to the cellular transmitter 50. The cellular transmitter 50 receives this information and transmits it to the paging service. As described above, the paging service receives this information and re-transmits it, in the form of a paging message, to the private emergency response service.

In an alternative embodiment, when the emergency response switch 12 changes state, the controller 36 sends the telephone number of the private emergency response service to the cellular transmitter 50. The cellular transmitter 50 then generates an outgoing RF cellular signal including the phone number of the private emergency response service, and the cellular signal is broadcast from the antenna 5 to the cellular provider network. With this embodiment, the cellular transmitter 50 transmits the identification number, the current time, and the location information directly to private emergency response service.

After the identification/time/location information has been transmitted to the private emergency response service, the controller 36 sends the telephone number of the nearest public emergency response service (such as 911) to the cellular transmitter 50. The cellular transmitter 50 then generates an outgoing RF cellular signal, including the phone number of the public emergency response service, which is broadcast from the antenna 5 to the cellular provider network.

Generally, when the public emergency response service receives the outgoing RF cellular signal from the player/phone 2, the service will answer the call by sending a reply cellular signal. The antenna 5 receives the incoming reply cellular signal from the public emergency response service, and the incoming signal is transferred across the microstrip line 54 to a receive filter 58. The receive filter 58 conditions the incoming RF signal to be processed by the cellular receiver 60. Based on the incoming RF cellular signal, the receiver 60 generates an audio communication signal on the line 61.

When the receiver 60 has received an incoming reply signal from the public emergency response service, the controller 36 sets the audio input switch 40 to the position 40a as shown in FIG. 5. In this position, the audio communication signal on the line 61 is present at the input to the audio amplifier 42. The controller 36 automatically adjusts the voltage on the line 41 to set the gain of the amplifier 42 to a comfortable level for the user. The controller 36 also maintains the audio output switch 44 at the position 44a to transfer the amplified audio communication signal to the earphones 8.

Once the cellular receiver 60 has received the reply signal from the public emergency response service, full duplex communication is established between the player/phone 2 and the public emergency response service. The user may then speak into the microphone 18 to communicate the nature of the emergency to the emergency response service. Based on the vocal communications from the user, the microphone 18 generates an electrical speech audio signal. The cellular transmitter 52 then generates an outgoing RF cellular signal based on the electrical speech audio signal from the microphone 18.

Figure 6:
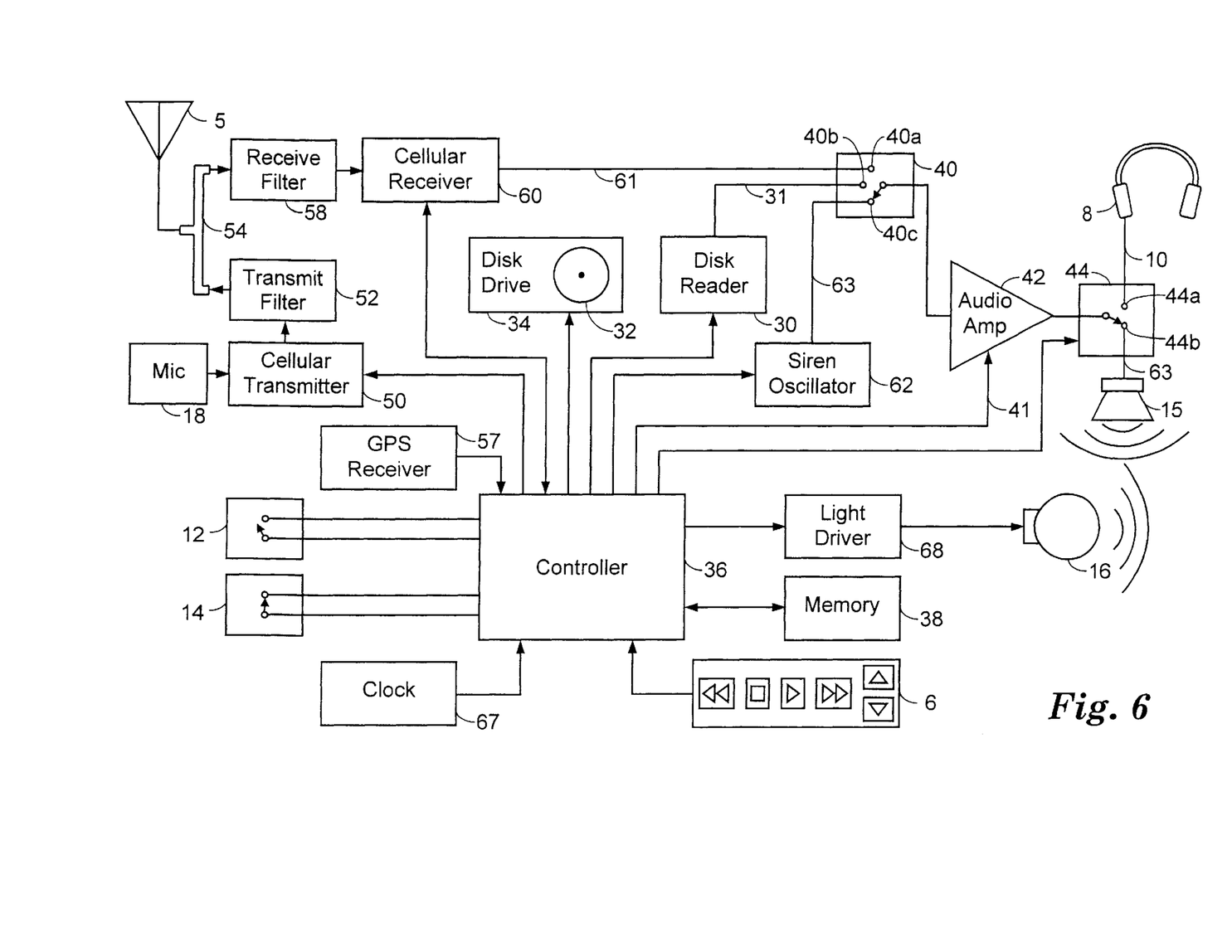
FIG. 6 is a functional block diagram of the combination compact disc player and emergency phone in an alarm mode.

As shown in FIG. 6, a preferred embodiment of the invention includes an aural alarm, such as a siren oscillator 62. If the alarm switch 14 is closed, the player/phone 2 enters an alarm mode and the controller 36 activates the siren oscillator 62. When the siren oscillator 62 is activated, it generates an alarm signal on the line 63 having an audio tone that varies in frequency in a siren-like manner. When the audio input switch is set to the position 40c, the line 63 is connected to the input of the audio amplifier 42. When the audio output switch 44 is set to the position 44b, the amplified alarm signal is sent to the speaker 15. The resulting acoustical alarm signal emanating from the speaker 15 alerts individuals in the area surrounding the player/phone 2 that an emergency situation exists.

When in the alarm mode, the controller 36 sets the audio input switch to the position 40c to connect the line 63 with the input to the audio amplifier 42 only if duplex communications have not been established with the public emergency response service. In this manner, if the user is in contact with emergency response personnel, the alarm signal will not be amplified and sent to the speaker 15. This feature is designed to prevent the microphone 18 from picking up the audible alarm signal from the speaker 15 and thus interfering with the user's communication with the emergency response personnel.

Additionally, whenever the controller 36 sets the audio input switch 40 to the position 40c to connect the siren oscillator 62 to the input of the amplifier 42, the controller 36 also sets the voltage on the line 41 to maximize the gain of the amplifier 42. This ensures that a high intensity audible alarm signal will be generated by the speaker 15, thus increasing the possibility that the alarm will get the attention of someone in the user's vicinity.

Further, as shown in FIG. 6, when the controller 36 sets the audio input switch 40 to the position 40c to connect the siren oscillator 62 to the input of the amplifier 42, the controller 36 also sets the audio output switch 44 to the position 44b to direct the amplified alarm signal to the speaker 15. This feature prevents the amplified alarm signal from going to the earphones 8 and possibly damaging the user's hearing.

To summarize the alarm mode, if the alarm switch 14 is closed and there is no duplex communication established between the player/phone 2 and the public emergency response service, then the audio input switch 40 is set to the position 40c, the audio amplifier gain is maximized, and the audio output switch 44 is set to the position 44b.

As mentioned previously, the preferred embodiment of the invention also includes the visual alarm, such as the flashing light 16, to visually attract the attention of persons within the visual range of the player/phone 2. Whenever the alarm switch 14 is closed as shown in FIG. 6, the controller 36 activates a light driver circuit 68 that causes the light 16 to flash on and off. Since the flashing light will not interfere with cellular communications, the activation of the flashing light 16 is in no way dependent on the cellular communication status.

Whenever the emergency response switch 12 or the alarm switch 14 is closed (as shown in FIGS. 5 and 6), the disc drive 34 and the disc reader 30 are turned off. In this way, all battery power is available for the cellular communication, siren, and light functions. Further, whenever the emergency response switch 12 and the alarm switch 14 are open (as shown in FIG. 4), the cellular transmitter 50 and cellular receiver 60 are turned off. Consequently, all battery power is then available for the personal audio function.

It will be appreciated that the controller 36 could also be configured to treat the emergency response switch 12 and the alarm switch 14 as active (on) when they are in the open position instead of in the closed position.

With continued reference to FIG. 5, the controller 36 prompts the GPS receiver 57 to determine the location of the player/phone 2 when the emergency response switch 12 changes state. Once the GPS receiver 57 has determined the coordinates of the player/phone 2, the GPS receiver 57 provides the coordinates to the controller 36. The controller 36 then sends the coordinates to the cellular transmitter 50. The cellular transmitter 50 sends the location coordinates to the public emergency response service by way of the cellular telephone network. The location coordinates allow the public emergency response service to dispatch emergency personnel to the location from which the call was placed, even if the caller does not know or cannot communicate the location. As discussed above, these location coordinates are also sent to the private emergency response service.

Figure 7:
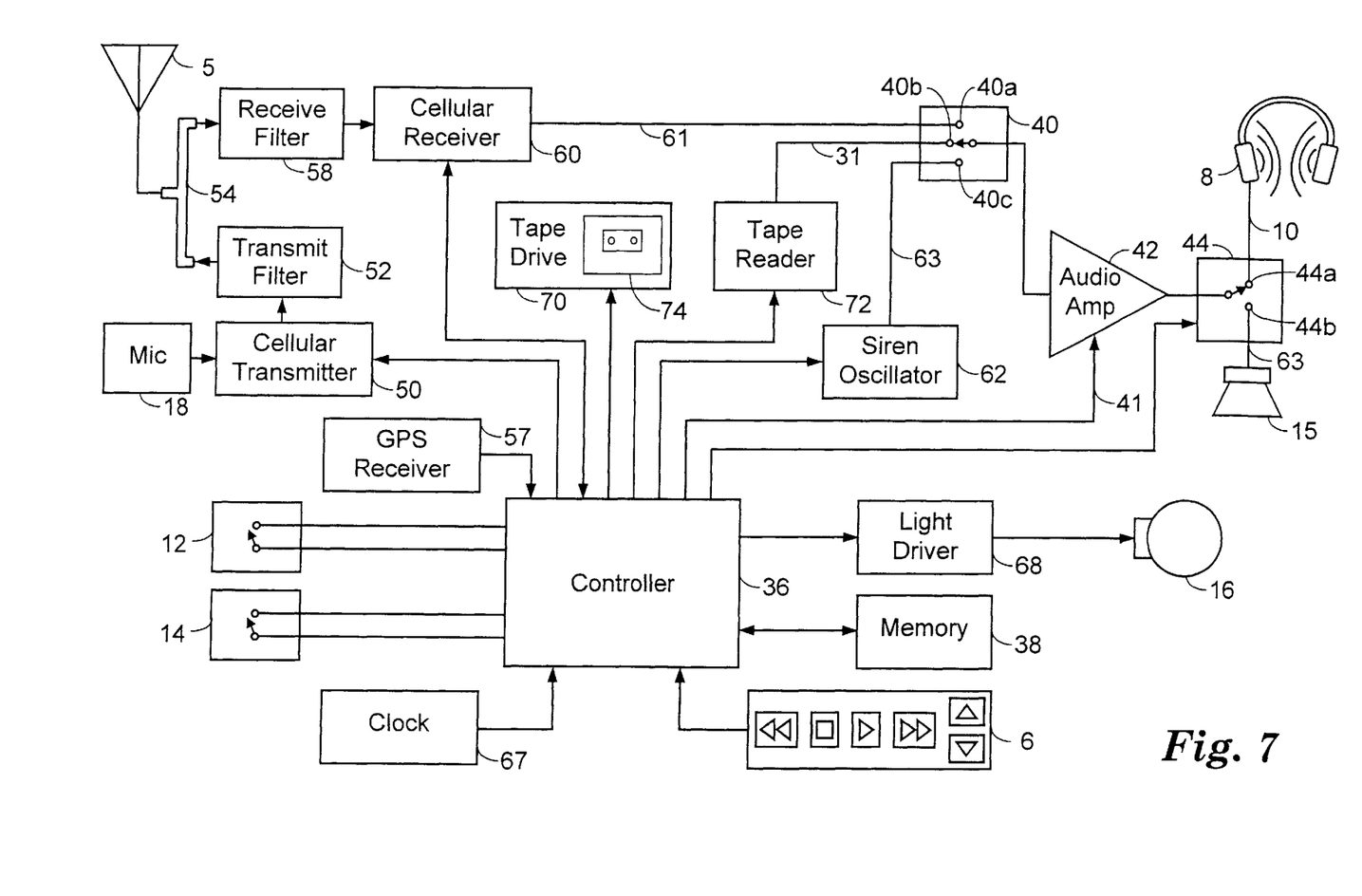
FIG. 7 is a functional block diagram of a combination magnetic cassette tape player and emergency phone in a personal audio mode.

In an alternative embodiment of the invention shown in FIG. 7, the audio information access device 20 (see FIG. 3) includes a magnetic cassette tape drive 70 and a magnetic cassette tape reader 72 for accessing audio information from a magnetic cassette tape 74. The operation of this alternative embodiment in all other respects is the same as that described above for the preferred embodiment. It will be appreciated that other forms of audio data storage and retrieval may also be employed in the practice of the invention.

Figure 8:
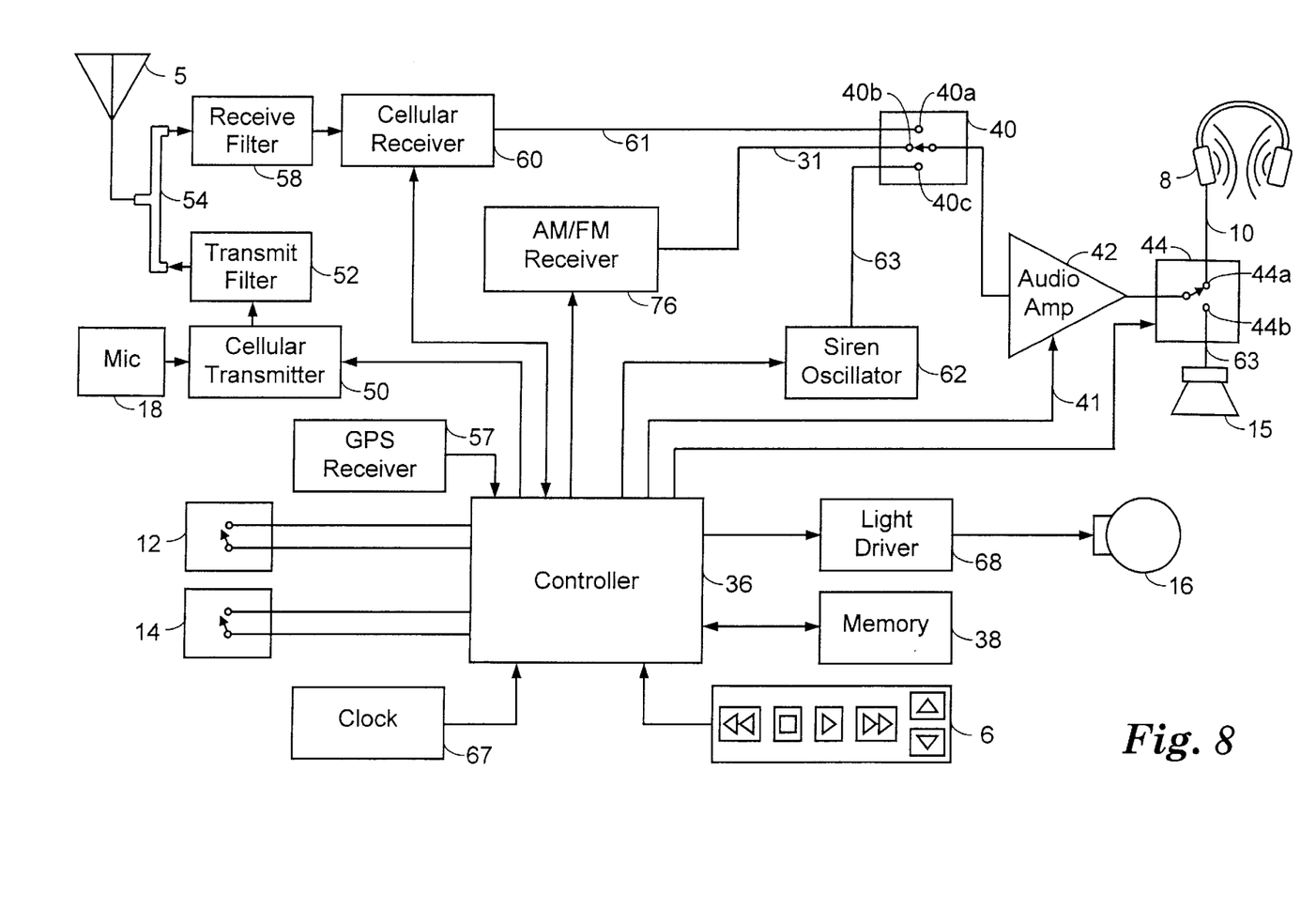
FIG. 8 is a functional block diagram of a combination AM/FM receiver and emergency phone in a personal audio mode.

For example, in another embodiment of the invention shown in FIG. 8, the audio information access device 20 (see FIG. 3) includes an AM/FM radio receiver 76 for receiving AM or FM radio broadcast signals. In this embodiment, the AM/FM receiver 76 produces an electrical audio information signal on the line 31 based upon audio information carried by the AM or FM radio signals. In all other respects, the operation of this alternative embodiment is the same as that described above for the preferred embodiment.

In yet another embodiment, the cellular transmitter 50 uses digital modulation and transmits a digitally-modulated outgoing signal. The cellular receiver 60 of this embodiment decodes a digitally-modulated incoming signal and generates an audio signal on the line 61 based on the digitally-modulated incoming signal.

While the invention has been described in detail, it will be apparent to persons skilled in the relevant art that the invention may be modified without departing from the spirit of the invention. Various changes in form, design or arrangement may be made to the invention without departing from the spirit and scope of the invention. Therefore, the above description is to be considered exemplary, rather than limiting, and the true scope of the invention is defined in the following claims.

What is claimed is:

1. An electronic apparatus for providing a user with personal audio entertainment and full duplex wireless communication with one or more emergency response services, the apparatus comprising:

a rigid housing constructed from lightweight materials;

an audio information access device disposed within the housing for accessing audio information from an audio information source, and for producing an electrical audio information signal based on the audio information;

only one large emergency response button disposed on the rigid housing, the emergency response button being the user's sole means for activating the apparatus to initiate wireless communication with the one or more emergency response services, there being no control buttons for initiating wireless communication other than the one emergency response button;

a single emergency response switch disposed within the rigid housing, a state of which is changed by pressing the one large emergency response button;

a controller for monitoring the state of the single emergency response switch and for executing a plurality of emergency operations in response to a change in the state of the emergency response switch, the emergency operations including activating a transmitter to place an emergency telephone call to the one or more emergency response services;

the transmitter disposed within the housing for generating an outgoing communication signal when activated by the controller to communicate with the one or more emergency response services, the outgoing communication signal containing communication information necessary to establish communications with the one or more emergency response services;

a receiver disposed within the housing for receiving an incoming communication signal from the one or more emergency response services, and for generating an audio communication signal based upon the incoming communication signal;

an audio amplifier disposed within the housing for receiving and amplifying the electrical audio information signal and the audio communication signal to produce an amplified electrical audio information signal and an amplified audio communication signal; and a sound production device electrically connected to the audio amplifier, for converting the amplified electrical audio information signal and the amplified audio communication signal into acoustical sound waves capable of being aurally perceived by the user.

2. The apparatus of claim 1 wherein the audio information access device further comprises an audio information retrieval device for retrieving audio information stored on an information storage medium, and for generating the electrical audio information signal based upon the audio information retrieved from the information storage medium.

3. The apparatus of claim 2 wherein the information storage medium is a digital audio disc, and the information retrieval device further comprises a digital audio disc player.

4. The apparatus of claim 2 wherein the information storage medium is magnetic tape, and the information retrieval device further comprises a magnetic tape player.

5. The apparatus of claim 1 wherein the audio information access device further comprises a broadcast signal receiver for receiving a broadcast signal that carries audio information from a broadcast signal source, the broadcast signal receiver for accessing the audio information carried by the broadcast signal and for generating the electrical audio information signal based upon the audio information carried by the broadcast signal.

6. The apparatus of claim 5 wherein the broadcast signal receiver further comprises a frequency modulation (FM) radio receiver.

7. The apparatus of claim 5 wherein the broadcast signal receiver further comprises an amplitude modulation (AM) radio receiver.

8. The apparatus of claim 1 further comprising:
an audio input switch for receiving the electrical audio information signal from the audio information access device and the audio communication signal from the receiver, and for directing the electrical audio information signal to the audio amplifier when the audio input switch is in a first state, and for directing the audio communication signal to the audio amplifier when the audio input switch is in a second state; and
a controller for determining whether the audio input switch is in the first state or the second state.

9. The apparatus of claim 1 wherein
the transmitter further comprises a radio-frequency cellular telephone transmitter for generating an outgoing cellular telephone signal containing communication information necessary to establish cellular telephone communications with the emergency response service; and
the receiver further comprises a radio-frequency cellular telephone receiver for receiving an incoming cellular telephone signal from the emergency response service, and for generating an audio communication signal based upon the incoming cellular telephone signal.

10. An apparatus for providing a user with personal audio entertainment and wireless communication with an emergency response service, comprising:
a rigid housing constructed from lightweight materials;
an audio information access device disposed within the housing for accessing audio information from an audio information source, and for producing an electrical audio information signal based on the audio information;
a transmitter disposed within the housing for producing outgoing communication signals capable of reaching and being received by a private emergency response service and a public emergency response service, the transmitter, when activated, for producing a first outgoing communication signal containing information for the private emergency response service, and immediately after completion of communication with the private emergency response service, automatically producing a second outgoing communication signal to communicate with the public emergency response service;
a receiver disposed within the housing for receiving an incoming communication signal from the public emergency response service, and for generating an audio communication signal based upon the incoming communication signal;
an audio amplifier disposed within the housing for receiving and amplifying the electrical audio information signal and the audio communication signal to produce an amplified electrical audio information signal and an amplified audio communication signal; and
a sound production device electrically connected to the audio amplifier, for converting the amplified electrical audio information signal and the amplified audio communication signal into acoustical sound waves capable of being aurally perceived by the user.

11. The apparatus of claim 10 wherein the transmitter is further operable to produce, as the first outgoing communication signal, a paging signal containing information for identifying and indicating the location of the apparatus.

12. The apparatus of claim 11 wherein the transmitter is further operable to transmit the paging signal directly to the private emergency response service.

13. The apparatus of claim 11 wherein the transmitter is further operable to transmit the paging signal to a central paging service that forwards the information for identifying and indicating the location of the apparatus to the private emergency response service.

14. The apparatus of claim 1 wherein
the transmitter further comprises a digital signal transmitter for generating an outgoing digitally-modulated signal containing communication information necessary to establish digital communications with the emergency response service; and
the receiver further comprises a digital signal receiver for receiving an incoming digitally-modulated signal from the emergency response service, and for generating an audio communication signal based upon the incoming digitally-modulated signal.

15. The apparatus of claim 1 wherein the sound production device further comprises an earphone.

16. The apparatus of claim 15 wherein the sound production device further comprises a wireless earphone.

17. The apparatus of claim 1 further comprising a visual alarm for alerting individuals in an area surrounding the apparatus that an emergency situation exists.

18. The apparatus of claim 1 further comprising:
a microphone disposed in the housing and electrically connected to the transmitter, the microphone for generating electrical speech audio signals corresponding to vocal communications from the user; and
the transmitter receiving the electrical speech audio signals from the microphone and generating an outgoing communication signal based thereon.

19. The apparatus of claim 10 further comprising a location determining device for determining the location of the apparatus.

20. The apparatus of claim 19 wherein the location determining device includes a global positioning system (GPS) receiver for determining the location of the apparatus.

21. An electronic apparatus for providing a user access to audio information stored on a digital audio disc, and for providing wireless telephone communication with a public emergency response service and with a private emergency response service, the apparatus comprising:
a rigid housing constructed from lightweight materials;
a digital audio disc player disposed within the housing for accessing the audio information stored on the digital audio disc, and for generating an electrical audio information signal based upon the audio information;

only one large emergency response button disposed on the rigid housing, the emergency response button being the user's sole means for activating the apparatus to initiate wireless telephone communication with the public or private emergency response services, there being no control buttons for activating the apparatus to initiate wireless telephone communication other than the one emergency response button;

a single emergency response switch disposed within the rigid housing, a state of which is changed by pressing the one large emergency response button;

a controller for monitoring the state of the single emergency response switch, and for executing a plurality of emergency operations in response to a change in the state of the emergency response switch, the emergency operations including activating a transmitter to place an emergency telephone call to the one or more emergency response services;

a radio-frequency cellular telephone transmitter which, when activated by the controller, produces outgoing radio cellular signals, including a first outgoing cellular radio signal containing information for the private emergency response service, and immediately after completion of communication with the private emergency response service, automatically producing a second outgoing cellular radio signal to communicate with the public emergency response service, a radio-frequency cellular telephone receiver disposed within the housing for receiving an incoming cellular telephone signal from the public emergency response service, and for generating an audio communication signal based upon the incoming cellular telephone signal;

an audio amplifier disposed within the housing and electrically connected to the digital audio disc player, for receiving and amplifying the electrical audio information signal and the audio communication signal to produce an amplified electrical audio information and an amplified audio communication signal; and an earphone for receiving and converting the amplified electrical audio information signal and the amplified audio communication signal into acoustical sound waves capable of being aurally perceived by the user.

* * * * *